United States Patent Office 2,861,094
Patented Nov. 18, 1958

2,861,094

PHOSPHOROTHIOLOTHIONATES DERIVED FROM ESTERS OF ALKENE- AND ALKANE-1,1-DIOLS

Richard L. McConnell and Thomas H. Wicker, Jr., Kingsport, Tenn., assignors to Eastman Kodak Company, Rochester, N. Y., a corporation of New Jersey No Drawing. Application August 28, 1957
Serial No. 680,684

12 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with certain organic esters of saturated and unsaturated diols and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with certain organic esters of alkene-1,1-diols or organic esters of alkane-1,1-diols. The new products of this invention have the structural formula:

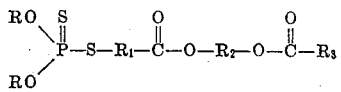

wherein R is a lower alkyl radical containing 1 to 4 carbon atoms, $R_1$ is an organic radical selected from the group consisting of radicals having the formula $(CH_2)_n$ and corresponding halogenated radicals, wherein $n$ is an integer of 1 to 3, $R_2$ is an organic radical selected from the group consisting of radicals having the formula $(CH_2)_n$, $C_nH_{2n-2}$ and corresponding halogenated radicals, wherein $n$ is an integer of 1 to 4 and $R_3$ is an organic radical selected from the group consisting of radicals haivng the formula $C_nH_{2n-1}$, wherein $n$ is an integer of 1 to 3, and halogenated lower alkyl radicals.

In preparing the products of this invention, dialkyl phosphorothiolothionates having the following structural formula are used:

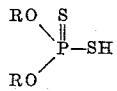

wherein R is a lower alkyl radical containing from 1 to 4 carbon atoms. In those instances where the organic ester reactants contains halogen radicals the dialkyl phosphorothiolothionate can be replaced by its ammonium salt. The organic esters that are used in preparing the compounds of this invention have the structural formula:

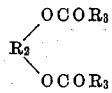

wherein $R_2$ and $R_3$ are as defined above in the structural formula for the products of this invention.

In the practice of this invention we prefer to add one of the reactants gradually to a reactor containing the other reactant. For example, the organic ester can be added gradually to a reactor containing the dialkylphosphorothiolothionate. Alternatively however, the reverse procedure of addition of reactants can be used and the dialkylphosphorothiolothionate can be added to a reactor containing the organic ester. If the organic ester contains more than one double bond of unsaturated carbon-to-carbon linkage it is preferred to add the dialkylphosphorothiolothionate to the organic ester. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 125° C. However, it will be realized that in some instances temperatures outside this range can be employed. The reaction time usually varies from 1 to 8 hours, but longer and shorter reaction periods are sometimes used. Normally it is unnecessary to employ a catalyst for the reaction since the dialkylphosphorothiolothionate will react with these unsaturated esters in the absence of a catalyst. If it is considered desirable to employ a catalyst, there are certain catalysts that can be used, for example, the tertiary amines, such as triethyl amine, and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

The following examples are illustrative of the compounds within the scope of this invention, their method of preparation and their utility as insecticides.

*Example 1.—O,O-diethyl S-{1-[1-(crotonoxy)allyloxycarbonylmethyl]ethyl} phosphorothiolothionate*

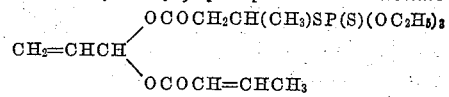

Diethyl phosphorothiolothionate (0.1 mole) was added dropwise with stirring to 2-propene-1,1-diol dicrotonate (0.1 mole). The reaction was exothermic, and the temperature of the reaction mixture rose to about 40° C. After the temperature had dropped to room temperature, the reaction mixture was stirred and heated on the steam bath for 1 hour. The product was then placed under reduced pressure (2–3 mm.) at 25° C. for 30 minutes to remove any volatile impurities.

*Example 2.—O,O-diethyl S-{1-[1-(crotonoxy)ethoxycarbonylmethyl]ethyl} phosphorothiolothionate*

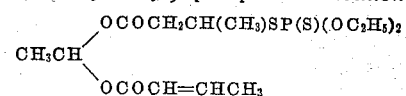

This compound was prepared from 1,1-ethanediol dicrotonate (0.1 mole) and diethyl phosphorothiolothionate (0.1 mole) according to the procedure of Example 1.

*Example 3.—O,O-dimethyl S-{2-[1-(acryloyloxy)-2-methylpropoxy - carbonyl]ethyl}phosphorothiolothionate*

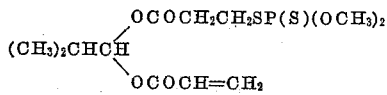

This compound was prepared from dimethyl phosphorothiolothionate (0.1 mole) and 2-methyl-1,1-propanediol diacrylate (0.1 mole) according to the procedure of Example 1.

*Example 4.—O,O-diethyl S - {2 - [(1-acryloyloxy-2,2,2-trichloroethoxy)carbonyl]ethyl}phosphorothiolothionate*

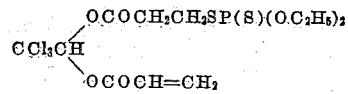

This compound was prepared from diethyl phosphorothiolothionate (0.1 mole) and 2,2,2-trichloro-1,1-ethanediol diacrylate (0.1 mole) according to the procedure of Example 1.

*Example 5.—O,O-diethyl S-[dichloro-(1-trichloroacetoxyallyloxy)carbonylmethyl]phosphorothiolothionate*

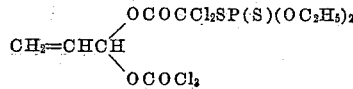

The ammonium salt of diethyl phosphorothiolothionate (0.1 mole) and 2-propene-1,1-diol bis(trichloroacetate) (0.1 mole) were mixed in 200 ml. of benzene and refluxed for 6 hours. The precipitated ammonium chloride was removed by filtration, and the benzene was removed by distillation leaving the product as a transparent oil.

*Example 6.—O,O-diisopropyl S-[2-(1-methacryloyloxy-2,2,2-trichloroethoxycarbonyl) - 2 - methylethyl]phosphorothiolothionate*

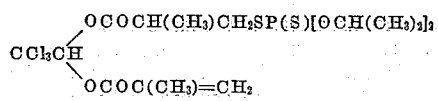

This compound was prepared from diisopropyl phosphorothiolothionate (0.1 mole) and 2,2,2-trichloro-1,1-ethanediol dimethacrylate according to the procedure of Example 1.

*Example 7.—O,O-diethyl S-[chloro-(1-dichloroacetoxyallyloxy)carbonylmethyl]phosphorothiolothionate*

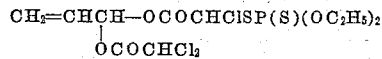

This compound was prepared from the ammonium salt of diethyl phosphorothiolothionate (0.1 mole) and 2-propene-1,1-diol bis(dichloroacetate) (0.1 mole) in refluxing toluene according to the procedure of Example 5.

*Example 8.—O,O-diethyl S-[dibromo-(1-tribromoacetoxyethoxy)carbonylmethyl]phosphorothiolothionate*

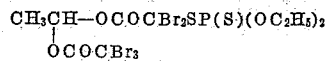

This compound was prepared from the ammonium salt of diethyl phosphorothiolothionate (0.1 mole) and 1,1-ethanediol bis(tribromoacetate) (0.1 mole) in refluxing benzene according to the procedure of Example 5.

*Example 9.—Insecticidal activity*

Tests against 2-spotted mites were carried out in the following manner. Acetone solutions containing 1% of the candidate compounds were prepared and diluted with water to give solutions containing the desired concentration of the candidate compounds for testing. Two heavily infested bean leaves containing adult 2-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites. Similar tests were carried out against the cowpea aphid (*Aphis medicaginis* Koch).

It should be noted that tests using acetone-water solutions (containing none of the toxicant) kill neither mites nor aphids. This is the blank run referred to in Table 1.

TABLE 1

| Toxicant | Concentration, p. p. m. | Percent Kill Mites | Percent Kill Aphids |
| --- | --- | --- | --- |
| 1. Blank | 0 | 0 | 0 |
| 2. Product of Ex. 1 | 100 | 96 | 100 |
| 3. Product of Ex. 5 | 100 | 100 | 100 |

The products of the other examples were also effective as insecticides when tested in the above manner.

We claim:
1. As compositions of matter, the organophosphorus compounds having the structural formula:

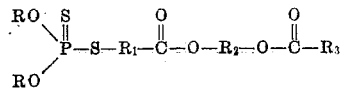

wherein R is a lower alkyl radical containing 1 to 4 carbon atoms, $R_1$ is an organic radical selected from the group consisting of radicals having the formula $(CH_2)_n$ and corresponding halogenated radicals, wherein $n$ is an integer of 1 to 3, $R_2$ is an organic radical selected from the group consisting of radicals having the formula $(CH_2)_n$, $C_nH_{2n-2}$ and corresponding halogenated radicals, wherein $n$ is an integer of 1 to 4 and $R_3$ is an organic radical selected from the group consisting of radicals having the formula $C_nH_{2n-1}$, wherein $n$ is an integer of 1 to 3, and halogenated lower alkyl radicals.

2. As a composition of matter, O,O-diethyl S-{1-[1 - (crotonoxy)allyloxycarbonylmethyl]ethyl}phosphorothiolothionate.

3. As a composition of matter, O,O-diethyl S-{1-[1 - (crotonoxy)ethoxycarbonylmethyl]ethyl}phosphorothiolothionate.

4. As a composition of matter, O,O-dimethyl S-{2-[1 - (acryloyloxy)-2-methylpropoxycarbonyl]ethyl}phosphorothiolothionate.

5. As a composition of matter, O,O-diethyl S-{2-[(1 - acryloyloxy - 2,2,2-trichloroethoxy)carbonyl]ethyl}phosphorothiolothionate.

6. As a composition of matter, O,O-diethyl S-[dichloro(1 - trichloroacetoxyallyloxy)carbonylmethyl]phosphorothiolothionate.

7. The method for producing new organophosphorus compounds which comprises reacting a compound selected from the group consisting of dialkyl phosphorothiolothionates having the formula:

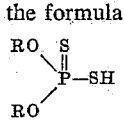

wherein R is a lower alkyl radical containing from 1 to 4 carbon atoms and ammonium salts of said dialkyl phosphorothiolothionates with an organic ester having the formula:

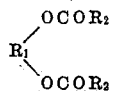

wherein $R_1$ is an organic radical selected from the group consisting of radicals having the formula $(CH_2)_n$, $C_nH_{2n-2}$ and corresponding halogenated radicals, wherein $n$ is an integer of 1 to 4 and $R_2$ is an organic radical selected from the group consisting of radicals having the formula $C_nH_{2n-1}$, wherein $n$ is an integer of 1 to 3, and halogenated lower alkyl radicals at a temperature within the range of —25 to 150° C.

8. The method for producing O,O-diethyl S-{1-1 - (crotonoxy)allkyloxycarbonylmethyl]ethyl}phosphorothiolothionate which comprises reacting 2-propene-1,1-diol dicrotonate with O,O-diethyl phosphorothiolothionate at a temperature within the range of —25 to 150° C.

9. The method for producing O,O-diethyl S-{1-[1 - (crotonoxy)ethoxycarbonylmethyl]ethyl} phosphorothiolothionate which comprises reacting 1,1-ethanediol dicrotonate with O,O-diethyl phosphorothiolothionate at a temperature within the range of —25 to 150° C.

10. The method for producing O,O-dimethyl S-{2-[1 - (acryloyloxy)-2-methylpropoxycarbonyl]ethyl}phosphorothiolothionate which comprises reacting 2-methyl-1,1-propanediol diacrylate with O,O-dimethyl phosphorothiolothionate at a temperature within the range of —25 to 150° C.

11. The method for producing O,O-diethyl S-{2-[1 - acryloyloxy - 2,2,2 - trichloroethoxy)carbonyl]ethyl} phosphorothiolothionate which comprises reacting 2,2,2-trichloro-1,1-ethanediol diacrylate with O,O-diethyl phosphorothiolothionate at a temperature within the range of —25 to 150° C.

12. The method for producing O,O-diethyl S-[dichloro - (1-trichloroacetoxyallyloxy)carbonylmethyl] phosphorothiolothionate which comprises reacting 2-propene-1,1-diol bis(trichloroacetate) with O,O-diethyl phosphorothiolothionate at a temperature within the range of —25 to 150° C.

No references cited.

UNITED STATES PATENT OFFICE
Certificate of Correction

Patent No. 2,861,094                                    November 18, 1958

Richard L. McConnell et al.

It is hereby certified that error appears in the printed specification of the above numbered patent requiring correction and that the said Letters Patent should read as corrected below.

Column 2, line 54, Example 1, the right-hand portion of the formula should read as shown below instead of as in the patent:

$$OCOCH_2CH(CH_3)SP(S)\ (OC_2H_5)_2$$

column 5, line 8, claim 8, for that portion of the compound reading

"1-(crotonoxy)allkyloxycarbonylmethyl]"

read

—[1-(crotonoxy)allyloxycarbonylmethyl]—.

Signed and sealed this 17th day of March 1959.

[SEAL]

Attest:
KARL H. AXLINE,
*Attesting Officer.*

ROBERT C. WATSON,
*Commissioner of Patents.*